(12) United States Patent
Gerhardt et al.

(10) Patent No.: US 9,115,815 B2
(45) Date of Patent: Aug. 25, 2015

(54) VARIABLE-VOLUME INJECTION VALVE (75) Inventors: Geoff C. Gerhardt, Millbury, MA (US); Keith Fadgen, Hope Valley, RI (US)

(73) Assignee: Waters Technologies Corporation, Milford, MA (US)

(*) Notice: Subject to any disclaimer, the term of this patent is extended or adjusted under 35 U.S.C. 154(b) by 231 days.

(21) Appl. No.: 13/808,263

(22) PCT Filed: Aug. 26, 2011

(86) PCT No.: PCT/US2011/049275
§ 371 (c)(1),
(2), (4) Date: May 1, 2013

(87) PCT Pub. No.: WO2012/027632
PCT Pub. Date: Mar. 1, 2012

(65) Prior Publication Data
US 2013/0206240 A1  Aug. 15, 2013

Related U.S. Application Data (60) Provisional application No. 61/377,492, filed on Aug. 27, 2010.

(51) Int. Cl.
*F16K 11/074* (2006.01)
*F16K 11/00* (2006.01)

(52) U.S. Cl.
CPC .............. *F16K 11/00* (2013.01); *F16K 11/0743* (2013.01); *Y10T 137/0318* (2015.04); *Y10T 137/86863* (2015.04)

(58) Field of Classification Search
CPC ................ F16K 11/00; F16K 11/0743; G01N 2030/201; G01N 2030/202; Y10T 137/8593
USPC ........................................ 137/625.11, 625.46
See application file for complete search history.

(56) References Cited

U.S. PATENT DOCUMENTS 2,911,008 A * 11/1959 Du Bois .................... 137/625.31
3,929,112 A * 12/1975 Pagdin ........................ 123/450
(Continued)

FOREIGN PATENT DOCUMENTS

JP    S62272155 A   11/1987
JP    H0387646 A    4/1991
(Continued)

OTHER PUBLICATIONS

International Search Report and Written Opinion for counterpart international patent application No. PCT/US2011/049275, mailed on Feb. 7, 2012; 2 pages.
(Continued)

*Primary Examiner* — Craig Schneider
*Assistant Examiner* — Kevin Barss
(74) *Attorney, Agent, or Firm* — Schmeiser, Olsen & Watts LLP (57) ABSTRACT

Variable-volume injection valves include a stator and a rotor. The stator has a first port, a second port, and a contact surface with a groove therein. The first port opens into the stator groove. The rotor has a contact surface with a groove therein. The contact surface of the rotor is urged against the contact surface of the stator such that the rotor groove opposes the stator groove with one end of the rotor groove overlapping the stator groove and the opposite end of the rotor groove overlapping the second port of the stator. The overlapping grooves of the rotor and stator provide a fluidic channel between the first and second ports of the stator. The rotor is movable with respect to the stator in order to vary a length of overlap between their overlapping grooves.

18 Claims, 7 Drawing Sheets

(56) References Cited

U.S. PATENT DOCUMENTS

| | | | |
|---|---|---|---|
| 5,792,943 | A | 8/1998 | Craig |
| 5,803,117 | A | 9/1998 | Olsen et al. |
| 6,012,488 | A * | 1/2000 | Nichols .................... 137/625.11 |
| 6,382,035 | B1 * | 5/2002 | Nichols ....................... 73/863.72 |
| 6,672,336 | B2 | 1/2004 | Nichols |
| 6,779,557 | B2 * | 8/2004 | Weiss ....................... 137/624.13 |
| 7,951,597 | B2 | 5/2011 | Usowicz et al. |
| 2005/0151371 | A1 * | 7/2005 | Simmons et al. .......... 285/125.1 |
| 2007/0137713 | A1 | 6/2007 | Keene |
| 2008/0190498 | A1 | 8/2008 | Keene et al. |
| 2008/0258094 | A1 | 10/2008 | Usowicz et al. |
| 2009/0050212 | A1 * | 2/2009 | Dourdeville et al. ............ 137/14 |
| 2009/0321356 | A1 * | 12/2009 | Gerhardt et al. ............... 210/656 |
| 2010/0187177 | A1 * | 7/2010 | Dehmer ........................ 210/659 |

FOREIGN PATENT DOCUMENTS

| | | |
|---|---|---|
| JP | 2005009994 A | 1/2005 |
| JP | 2008529010 A | 7/2008 |
| WO | 2009/003519 A1 | 1/2009 |

OTHER PUBLICATIONS

First Office Action in counterpart Japanese Patent Application No. 2013-526168, mailed on Jan. 27, 2015; 4 pages.

Japanese Patent Application Publication No. JPS5978970U, as received in connection with the First Office Action of Jan. 27, 2015 in counterpart Japanese Patent Application No. 2013-526168, with which no English abstract or translation was provided.

* cited by examiner

VARIABLE-VOLUME INJECTION VALVE

RELATED APPLICATIONS

This application is a 371 application of International Application No. PCT/US2011/049275, filed Aug. 26, 2011, titled "Variable-Volume Injection Valve," which claims the benefit of and priority to U.S. provisional application no. 61/377,492, filed Aug. 27, 2010 and titled "Variable-Volume Injection Valve," the entirety of which is incorporated by reference herein.

FIELD OF THE INVENTION

The invention relates generally to valves for switching pressurized fluids. More particularly, the invention relates to injection valves for liquid chromatography applications.

BACKGROUND

Chromatography is a set of techniques for separating a mixture into its constituents. For instance, in a liquid chromatography (LC) application, a solvent delivery system takes in and delivers a mixture of liquid solvents to an autosampler (also called an injection system or sample manager), where an injected sample awaits the arrival of this mobile phase. The mobile phase with the dissolved injected sample passes to a column. By passing the mixture through the column, the various components in the sample separate from each other at different rates and thus elute from the column at different times. A detector receives the separated components from the column and produces an output from which the identity and quantity of the analytes may be determined.

Figure 1A:
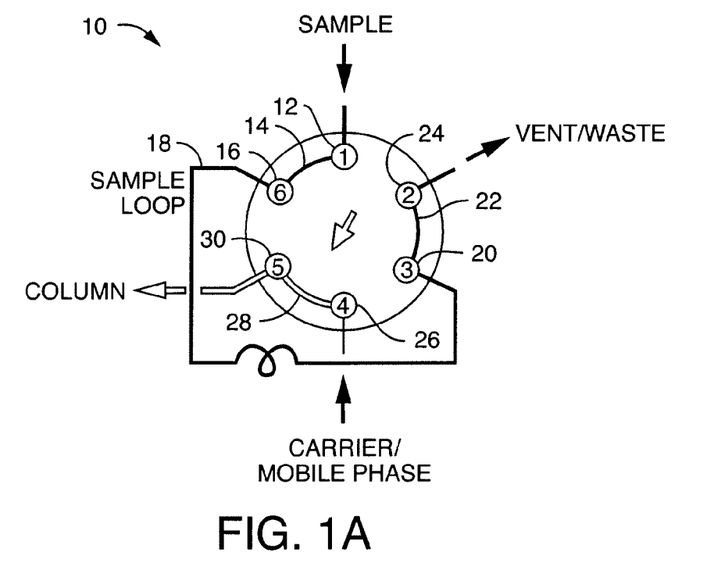
FIG. 1A and FIG. 1B are views of an embodiment of rotary valve in sample-loading and sample-injection orientations, respectively.
Figure 1B:
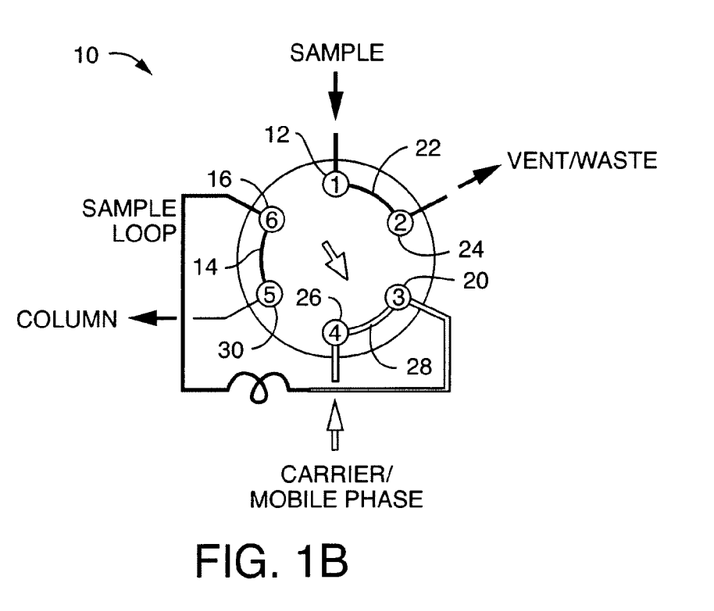

Some currently available nano/capillary LC injection systems use a fixed-volume sample injector or rely on the coordination of a pump and an injection valve to produce a variable volume of sample. Some typical HPLC (High Performance Liquid Chromatography) rotary injection valves utilize a fixed sample loop, in which sample is loaded by aspirating or pumping sample into the loop. Then the valve is repositioned to bring this loop online. These rotary HPLC injection valves typically have two positions: a load position, as illustrated by the rotary valve 10 in FIG. 1A; and an inject position, as illustrated in FIG. 1B.

In the load position, sample enters a sample-loading port 12. A conduit 14 of the valve 10 places the sample-loading port 12 in fluidic communication with a sample-loop port 16. The sample enters the sample loop 18, which extends from the sample-loop port 16 to a second sample-loop port 20. A second conduit 22 of the valve places the sample-loop egress port 20 in fluidic communication with a vent port 24. Also in the load position, carrier mobile phase enters a mobile phase ingress port 26 of the valve. A third conduit 28 of the valve fluidically connects the mobile phase ingress port 26 to a column port 30.

In the inject position, the valve 10 has rotated (here, counterclockwise) such that the conduit 14 now fluidically connects the sample-loop port 16 to the column port 30 and the conduit 28 fluidically connects the other sample-loop port 20 to the mobile phase ingress port 26. In this configuration, the mobile phase enters the sample loop to join the sample held within the sample loop 18, and both flow together out through the column port 30.

Such injection valves can be used in "full loop" mode by filling the entire sample loop 18 volume with sample, and in "partial loop" mode, where the sample is brought into only a portion of the loop. Using this "partial loop" mode, the amount of injected sample is variable. This "partial loop" mode increases the flexibility of these injection valves, because otherwise users would need to change the loop physically with every change of the desired injection volume. With the "partial loop" mode, the injection volume can be changed programmatically from run-to-run to accommodate different sample types.

Typical rotary injection valves use external loops formed of lengths of tubing that can be plumbed into the valve. This tubing allows the user to change the loop volume in those instances where, for example, the partial-loop mode does not accommodate the needed sample volume. These external loops work well for analytical-scale HPLC (i.e., 1 to 4.6 μm inner diameter (id) columns), where injection volumes are typically 5-100 μL. Capillary and nano-scale chromatography (75-300 μm column ids), however, typically require injection volumes of less than 1 μL, and often less than 100 nL. Tubing with a small enough id to transport these low volumes is difficult to find and the typical unswept volumes in the loop ports add undesirable chromatographic variance.

To address these low-volume requirements, rotary injection valves have been equipped with "internal loops", where the sample loop is created as a groove on the rotor or on stator of the valve. While these loops are capable of generating small injection volumes, it generally would be extremely difficult to attempt a "partial loop" injection using a loop of this size, as an extremely precise sample loading system would need to be employed to precisely position a sample in this small volume. Therefore, this type of "fixed loop" nano/capillary scale injector has typically been used for full-loop injections only. As a result, users generally must replace the injector (or rotor/stator) when they wish to use a different injection amount.

SUMMARY

In one aspect, the invention features a variable-volume injection valve comprising a stator and a rotor. The stator has a first port, a second port, and a contact surface with a groove therein. The first port opens into the stator groove. The rotor has a contact surface with a groove therein. The contact surface of the rotor is urged against the contact surface of the stator such that the rotor groove opposes the stator groove with one end of the rotor groove overlapping the stator groove and the opposite end of the rotor groove overlapping the second port of the stator. The overlapping grooves of the rotor and stator provide a fluidic channel between the first and second ports of the stator. The rotor is movable with respect to the stator in order to vary a length of overlap between their overlapping grooves and, thereby, to vary a volume of sample introduced to a mobile phase.

In another aspect, the invention features a method of introducing a sample to a mobile phase through use of an injection valve comprised of a stator and a rotor. The method comprises urging a contact surface of the rotor against a contact surface of the stator. The contact surface of the rotor has a groove therein and the contact surface of the stator has a groove therein. The stator further comprises a first port and a second port, the first port opening into the stator groove. A fluidic channel is provided between the first and second ports of the stator by positioning the rotor groove over the stator groove such that one end of the rotor groove overlaps the stator groove and the opposite end of the rotor groove overlaps the second port of the stator. An orientation of the rotor with respect to the stator is changed in order to vary a length of the overlap between the overlapping rotor and stator grooves and, thereby, to vary a volume of sample introduced to a mobile phase.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Variable-volume injection valves, as described herein, although useful generally for all scales of high-pressure liquid chromatography (HPLC) applications, are particularly suited to address the difficult problem of the injecting low sample volumes, typically encountered in capillary (300-500 µm column id) and nano-scale chromatography (75-150 µm column id), into the fluid stream of a chromatography apparatus. Accordingly, some preferred embodiments support small-molecule separations involving columns with ids less than approximately 300 µm, injection volumes in a 10 to 250 nL range, direct injection, and relatively fast changing solvent compositions.

In brief overview, the injection valves include a stator and a rotor, and use an on-rotor injection loop (or groove), in combination with features of the stator and a drive mechanism that can be indexed, to achieve variable volume sample injections for nano and capillary scale HPLC. More specifically, the injection groove is engraved in or embossed on the contact surface of a compliant rotor and another groove is machined or etched on the surface of the stator. The drive mechanism controls the rotational orientation of the rotor relative to the stator. This orientation determines the volume of sample injected into the solvent stream by determining the length of overlap between the rotor and stator grooves. In one injection valve configuration, the length of overlap affects the volume of sample that can be loaded into the rotor groove. In another injection valve configuration, the length of overlap affects the volume of sample that can be flushed out of the rotor groove into the solvent composition stream. By varying this length of overlap, a given injection valve can change the sample injection volume programmatically from run-to-run, for example, to accommodate different sample types.

Figure 2A:
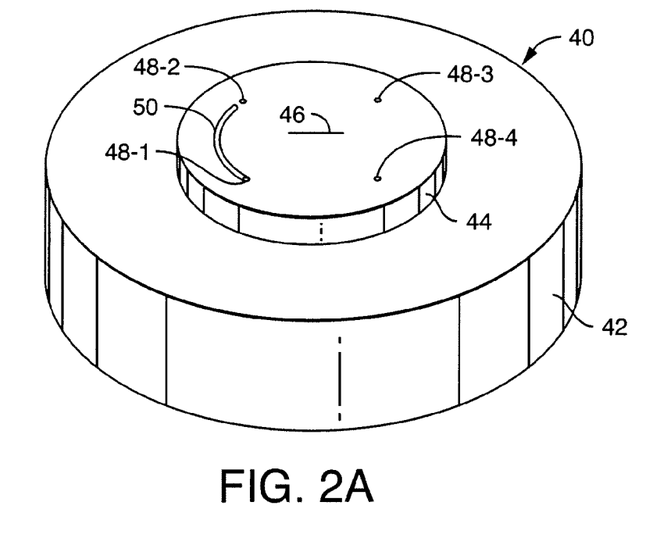
FIG. 2A and FIG. 2B are views of an embodiment of a stator of an injection valve.
Figure 2B:
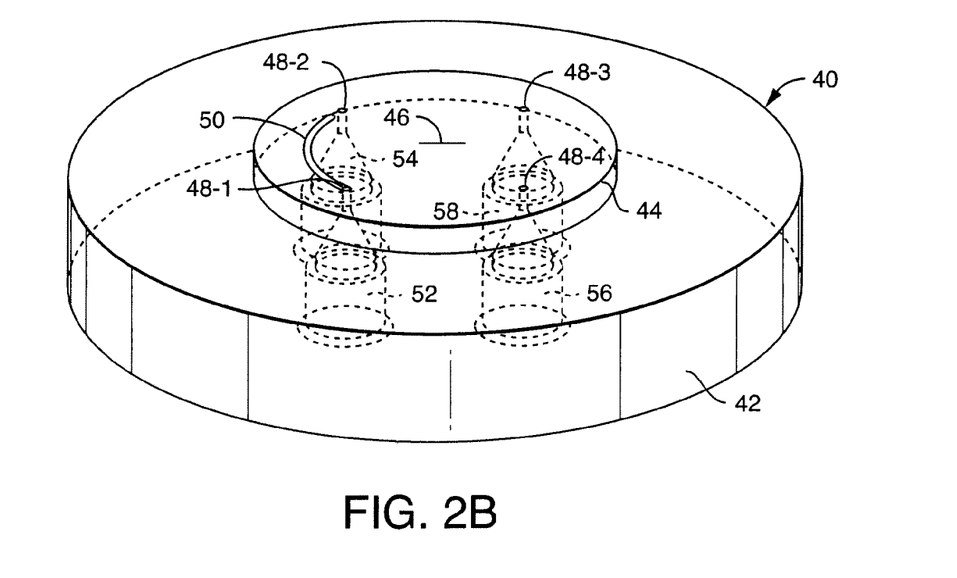

FIG. 2A and FIG. 2B show an embodiment of a stator 40 preferably constructed out of a metallic, or other relatively non-compliant material. The stator 40 has a major disk-like portion 42 and a raised disk-like portion 44 disposed centrally in the major disk portion 42. The raised portion 44 has a contact surface 46.

In the contact surface 46 are four fluidic port openings 48-1, 48-2, 48-3, and 48-4 (generally, 48) and a sample-feeder groove 50. The port openings 48 define the circumference of a notional circle, referred to as a bolt circle. The port opening 48-1 opens into one end of the sample-feeder groove 50. The sample-feeder groove 50 runs along the circumference of the bolt circle and, with one end starting at the port opening 48-1, extends less than the full circumferential distance to the port opening 48-2. In one embodiment, the sample-feeder groove 50 extends approximately 90% of the circumferential distance between the port openings 48-1, 48-2, and has a width of 0.008" and a depth of 0.008".

In this embodiment, sample-loading port 52 couples to the port opening 48-1, and plumbing connects the sample-loading port 52 to a sample manager. Sample provided by the sample manager enters the sample-feeder groove 50 through the port-opening 48-1 by way of the sample-loading port 52. Another sample-loading port 54 couples to the port opening 48-2 and is plumbed to provide a return fluidic path to the sample manager. A pump port 56 is fluidically coupled to the port opening 48-4 and is plumbed to receive a solvent composition stream from a pump. A column port 58 is fluidically coupled to port opening 48-3 and is plumbed to provide a fluidic path to the column. Each port 52, 54, 56, 58 comprises a tube receptacle with a conical region that tapers to a tip having a narrower inner diameter than the given port. A tube enters each port and extends to the end of its tip. The connection between the tip of each port and its respective port opening 48 is made through a relatively short conduit.

Figure 2C:
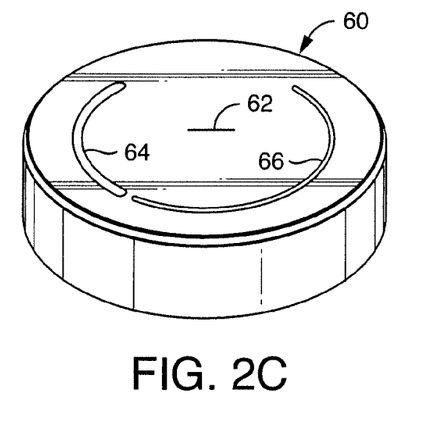
FIG. 2C is a view of an embodiment of a rotor of the injection valve.

FIG. 2C shows an embodiment of a rotor 60. The rotor 60, preferably constructed of a compliant polymeric material, has a contact surface 62 with two arcuate grooves: a injection groove 64 and a finer groove 66. The arcuate grooves 64, 66 run along the circumference of a bolt circle. The radius of the bolt circle of the rotor is equal to the radius of the bolt circle of the stator 40. The injection groove 64 is shorter, deeper, and wider than the finer groove 66. The length of the injection groove 64 preferably approximates the circumferential distance between the two sample-loading port openings 48-1, 48-2 on the stator 40, so that both port openings 48-1, 48-2 can be covered simultaneously by the injection groove 64, if desired during a load or inject phase. This length also approximately equals the circumferential distance between the column and pump port openings 48-3, 48-4. In one embodiment, the injection groove 64 forms approximately a 90-degree arc, the width is 0.014", and the depth is 0.014". The volume capacity of the injection groove 64 defines the maximum injection volume possible of the injection valve, such injection volume being a function of the cross-sectional area multiplied by the length of the groove.

The length of the finer groove 66 is designed to be at least as long as the combined circumferential lengths of the injection groove 64 and stator groove 50. This length ensures the finer groove 66 spans the full distance between the column and pump port openings 48-3, 48-4, irrespective of where the injection groove 64 overlaps the stator groove 50. In one embodiment, the finer groove 66 forms approximately a 135-degree arc, has a width of 0.008", and a depth of 0.008".

The rotor and stator grooves described herein are preferably arcuate in shape, such shapes being particular suited for rotary injection valves involving rotational movement of the rotor with respect to the stator. In other embodiments, the grooves have other shapes (e.g., linear), and the movement of the rotor with respect to the stator is other than rotational (e.g., linear).

Figure 3:
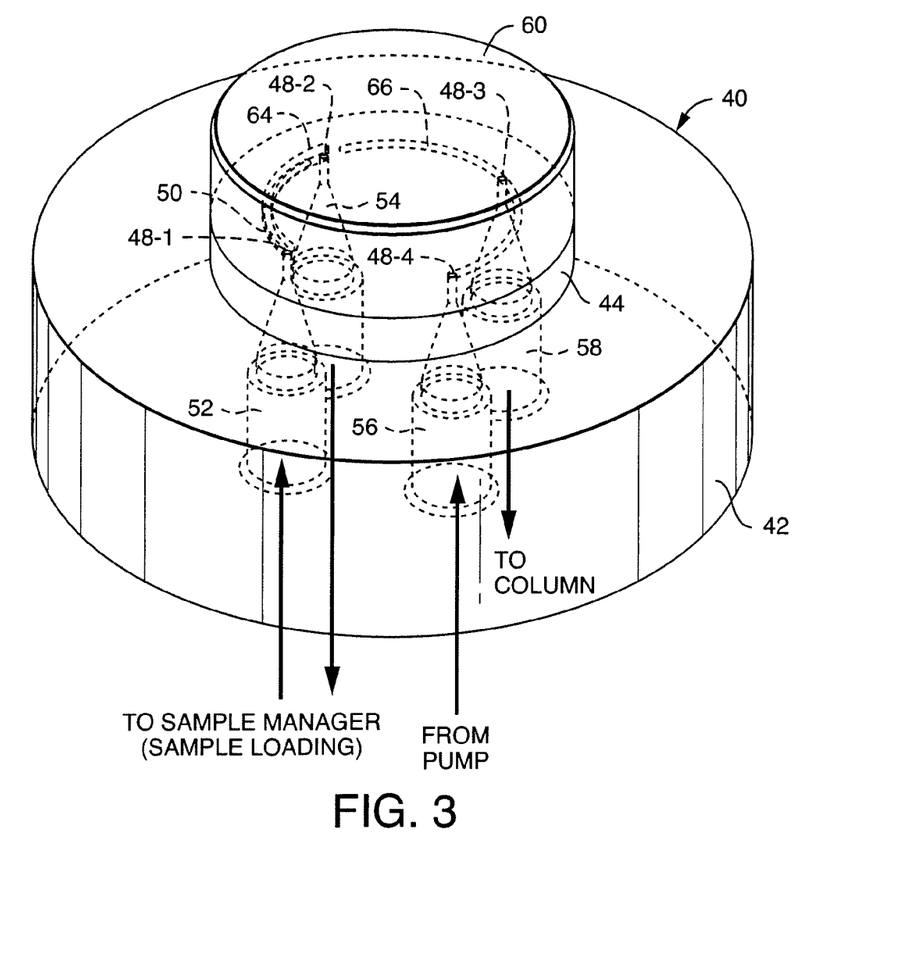
FIG. 3 is a view of the rotor and stator pressed together in a sample-loading orientation that completely fills an injection groove of the rotor.

FIG. 3 shows the rotor 60 and stator 40 abutting each other, such that the contact surface 62 of the rotor 60 presses against the contact surface 46 of the stator 40. The applied force that urges the rotor and stator together preferably produces a seal between the contact surfaces 62, 46 that can prevent leakage at fluidic pressures at least as great as 20,000 psi (e.g., in UPLC instruments, the fluidic pressure typically ranges between 15,000 psi and 20,000 psi). This applied force is maintained throughout the rotation of the rotor 60 relative to the stator 40.

In the rotational orientation shown in FIG. 3, the injection groove 64 of the rotor opposes the sample-feeder groove 50. The opposing grooves 50, 64 are so aligned such that the injection groove 64 of the rotor 60 overlaps the sample-feeder groove 50 of the stator 40. This alignment of the rotor and stator is one of a plurality of possible positions that permits sample loading into the injection groove 64 of the rotor. When so oriented for purposes of sample loading, sample can enter the injection groove 64 provided some overlap exists between the sample-feeder and injection grooves 50, 64.

In the particular alignment shown, one end of the injection groove 64 aligns with the end of the sample-feeder groove 50 having the port-opening 48-1. The other end of the injection groove 64 ends at the port opening 48-2. The overlapping grooves 50, 64 thus cooperate to provide a fluidic channel from the port opening 48-1 to the port opening 48-2. In this alignment, sample entering through the port opening 48-1 will completely fill the injection groove 64 of the rotor 60. As illustrated in more detail in connection with FIG. 4, the amount of overlap between the grooves 50, 64 affects the length of the injection groove 64 that can be filled with sample, which determines the amount of sample that can be held within the injection groove 64 for purposes of introduction to a solvent stream. Because the particular rotational orientation of the rotor with respect to the stator is rotatably adjustable, the amount of sample that can be moved into the injection groove 64 is variable, thus leading to a variable sample injection volume.

The orientation of FIG. 3 also has the finer groove 66 of the rotor disposed opposite both of the other port openings 48-3 and 48-4, thereby providing a fluidic connection between the pump and column. The column and pump ports 48-3 and 48-4 remain in fluidic connection while sample is loaded into the injection groove 64. One end of the finer groove 66 aligns with the pump port 48-4, whereas the other end of the finer groove 66 extends past the column port 48-3. This extended length of the finer groove 66 allows different rotor positions for loading sample into the injection groove 64, each different rotor position exposing a different length of the injection groove for receiving sample from the stator groove 40.

Figure 4:
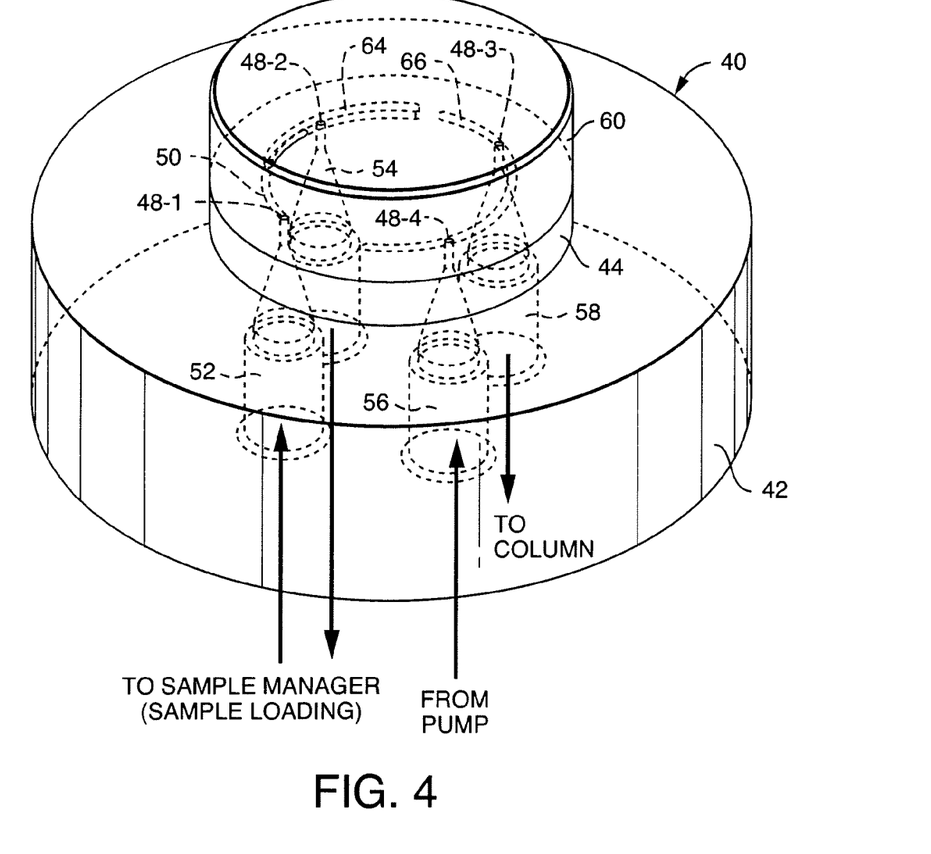
FIG. 4 is another view of the rotor and stator pressed together in a sample-loading orientation that partially fills the injection groove of the rotor.

FIG. 4 shows an example of a different orientation between the stator 40 and rotor 60 attained, for example, by an indexing drive mechanism (not shown), or other suitably position-controllable drive mechanism. The drive mechanism operates to rotate the rotor 60 relative to the stator in known increments. Each incremental rotation exposes a different known length of the injection groove 64 for purposes of loading with sample, thus varying the volume of injected sample as desired. In this example alignment, one end of the injection groove 64 overlaps the sample-feeder groove 50 of the stator 40 starting approximately midway of the sample-feeder groove 50. The other end of the injection groove 64 extends past the port opening 48-2 and terminates opposite the contact surface 46 of the stator 40. Like those of FIG. 3, the overlapping grooves 50, 64 provide a fluidic channel between the port openings 48-1, 48-2. In this orientation, sample fills only that length of the injection groove that extends from its overlapping end to the port opening 48-2; the length of injection groove 64 that extends past the port opening 48-2 is not exposed for receiving sample. Optionally, a non-sample fluid can be loaded into the injection groove 64 to impede sample from entering the non-exposed portion of the injection groove 64. When the rotor and stator are oriented such that only a portion of the injection groove 64 of the rotor is exposed between the sample-loading ports 48-1, 48-2, the finer groove 66 continues to provide a fluidic path between the port openings 48-3, 48-4 for the flowing mobile phase (i.e., solvent stream).

Figure 5:
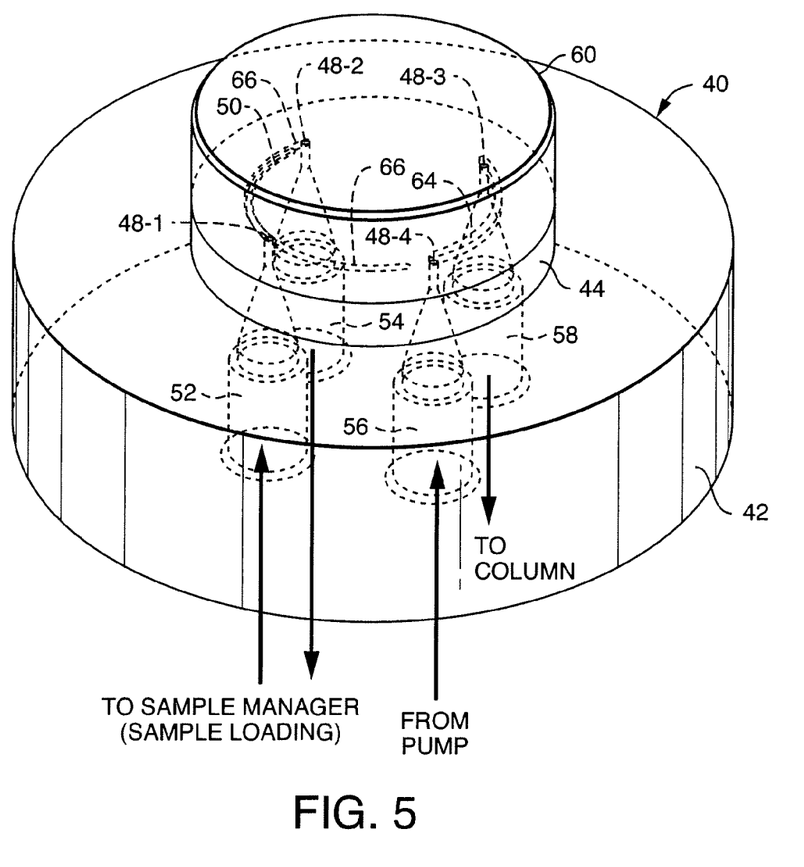
FIG. 5 is a view of the rotor and stator pressed together in an orientation configured for injection of the sample in the injection groove.

FIG. 5 shows an orientation of the stator 40 and rotor 60 in which the injection groove 64 of the rotor is in position to provide a fluidic path between the port openings 48-3, 48-4. In this position, the injection groove 64 places its full contents in the path of the solvent stream flowing from the pump port 56 to the column port 58. Whatever volume of sample is in the injection groove 64 is thus introduced to the mobile phase.

In addition to the sample loading and injection processes described above, preferably, sample-port washing steps typical with for rotary valves are utilized to insure any residual sample is washed from the injection valve prior to introducing a new sample.

According to another embodiment of injection valve, the sample loading ports 52, 54 swap locations with the pump and column ports 56, 58; that is, the pump and column ports 56, 58 connect to the port openings 48-1, 48-2, respectively, and the sample-loading ports 52, 54 connect to port openings 48-3, 48-4, respectively. In this configuration, the injection groove 64 is always completely filled during the sample-loading phase because the length of the injection groove 64 matches the distance between the port openings 48-3, 48-4 (connected to the sample-loading ports 52, 54). The injection groove 64 also receives the sample directly from the sample-loading port 52, rather than indirectly through the sample-feeder groove 50 of the stator 40 (as is the case in FIG. 3 and FIG. 4). After the injection groove is completely filled with sample, the drive mechanism changes the rotational orientation of the rotor and stator, so that the injection groove 64 overlaps the groove 50 of the stator 40 (which, in this embodiment, is not referred to as a "sample-feeder" groove, because the sample is fed into the injection groove 64 directly through the port opening 48-3, and not through the groove 50). In this configuration, the variableness of the sample injection volume is achieved during the injection phase, by varying the length of overlap between the injection groove 64 and the groove 50 of the stator 40.

Figure 6:
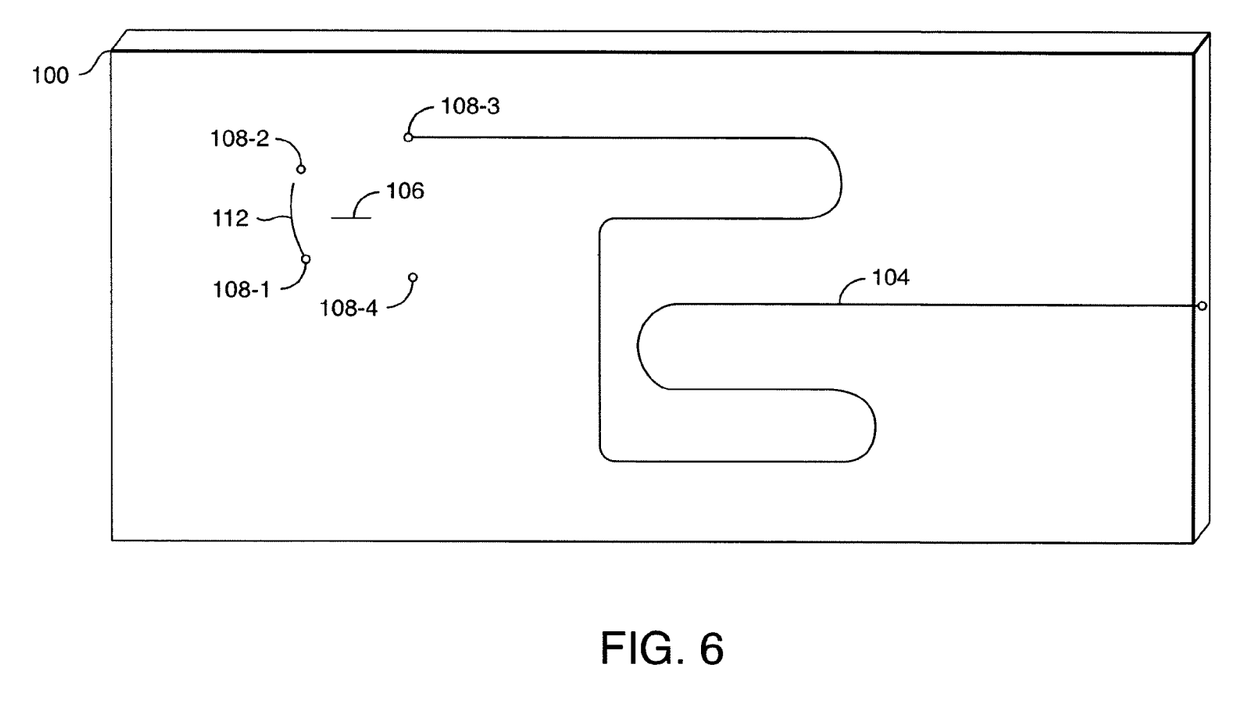
FIG. 6 is another embodiment of a stator implemented on a microfluidic substrate.

FIG. 6 shows a side view of an embodiment of a microfluidic substrate 100, which is an example of another embodiment of a stator that can be used in combination with the previously described rotor 60. In brief overview, the microfluidic substrate 100 is rectangular, flat, thin (approx. 0.050"), and of multilayer construction. The layers of the substrate can be made of a polymeric material, for example, PEEK, or of metal, for example, titanium. Formed within the layers of the microfluidic substrate 100 is a serpentine column 104 for transporting liquid and separating its various constituents. The microfluidic substrate 100 has a contact surface 106 having four microscopic fluidic apertures 108-1, 108-2, 108-3, and 108-4 (generally 108). The fluidic apertures 108 are disposed in a bolt-circle pattern similar to that of the four port openings 48 of the disk-shaped stator 40 described in FIGS. 2-5. An arcuate sample-feeder groove 112 in the contact surface 106 extends from fluidic aperture 108-1 to a location between the fluidic apertures 108-1, 108-2.

In one embodiment, sample enters the groove 112 through this aperture 108-1 and then from this groove 112 into the injection groove 64 of the rotor 60 (not shown). Aperture 108-3 is fluidically coupled to a pump (not shown) that delivers a solvent stream to the substrate 100, and aperture 108-4 is fluidically connected to the internal column 104. When the rotational orientation of the rotor is changed relative to the substrate so that the injection groove of the rotor overlaps the fluidic apertures 108-3, 108-4, the contents of the injection groove enter the solvent stream coming from the pump and passing into the column 104.

Figure 7:
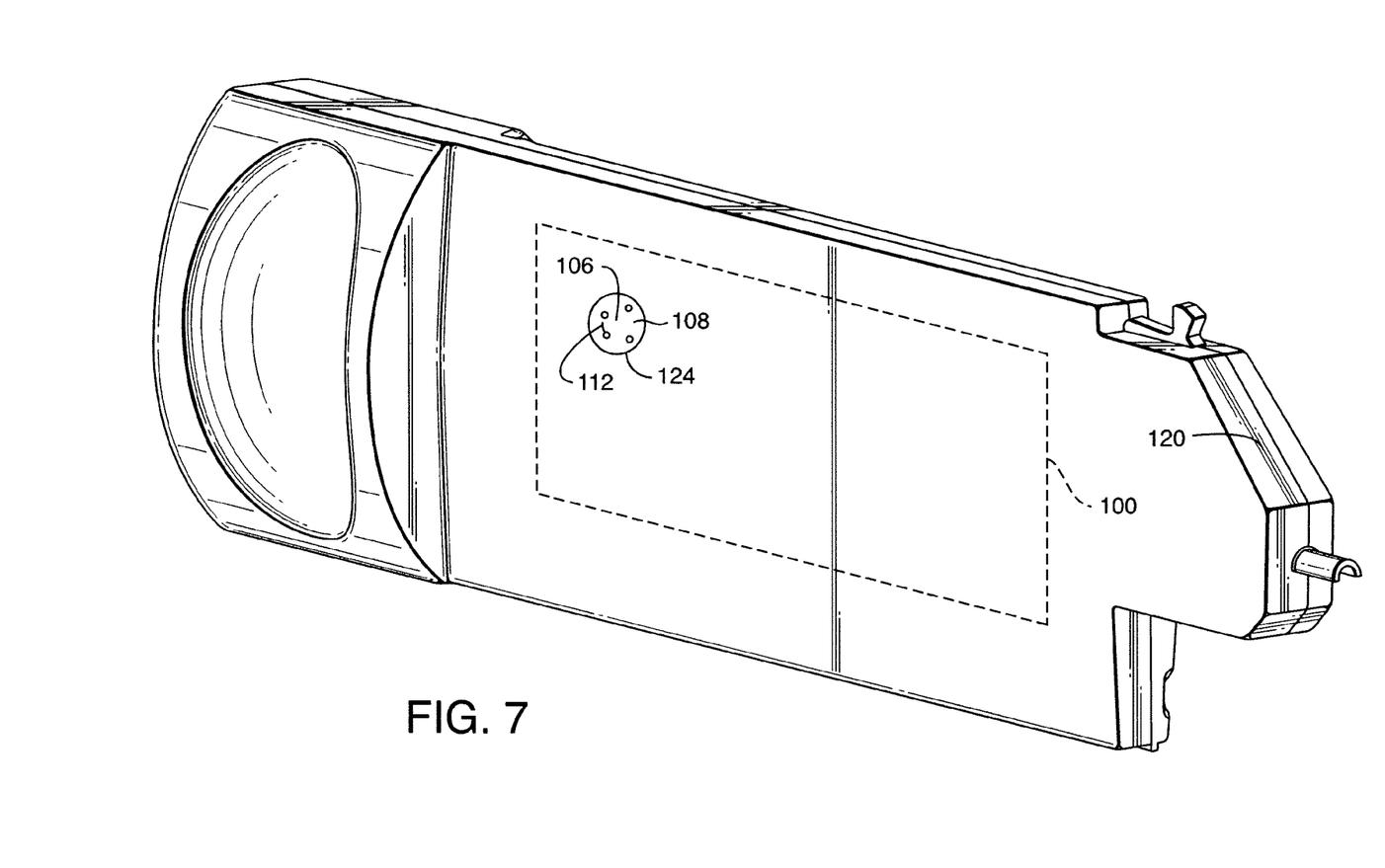
FIG. 7 is an embodiment of a microfluidic cartridge for housing the substrate of FIG. 6.

FIG. 7 shows an embodiment of a microfluidic cartridge 120 within which the microfluidic substrate 100, shown in phantom, may be housed. In addition to the substrate 100, the microfluidic cartridge 120 can house other components, for example, an emitter, a heater, and circuitry, and operate as an electromechanical interface for the delivery of voltages, electrical signals, and fluids (gas and liquid) to the various components housed within the microfluidic cartridge 120. An example implementation and use of such a microfluidic cartridge is described in PCT application no. PCT/US2010/026352, with an international filing date of Mar. 5, 2010. In the side of the cartridge 120 is a circular opening 124, within which are exposed the four fluidic apertures 108 of the substrate 100 and the groove 112 (these features being microscopic and, thus, scarcely perceptible because of scale). The opening 124 is sized to receive closely a rotor (such as rotor 60), with sufficient clearance to permit rotation of the rotor. An applied force urges the rotor against the substrate 100 to produce a seal between the contact surfaces 106, 62 that is maintained throughout the rotation of the rotor 60 relative to the substrate 100.

While the invention has been shown and described with reference to specific preferred embodiments, it should be understood by those skilled in the art that various changes in form and detail may be made therein without departing from the spirit and scope of the invention as defined by the following claims. For example, the particular location of the sample-feeder groove 50 on the stator is just one illustrative embodiment. For instance, without departing from the principles described herein, the sample-feeder groove 50 could alternatively start at the port opening 48-2 and extend less than the full circumferential distance towards the port opening 48-1. Sample can still be provided through the port opening 48-1, but instead of entering the sample-feeder groove 50, the sample passes directly into the rotor injection groove 64 and enters the sample-feeder groove 50 where the two grooves overlap.

What is claimed is:

1. A variable-volume injection valve comprising:
   a stator having a first port, a second port, and a contact surface with a groove therein, the first port opening into the stator groove; and
   a rotor having a contact surface with a groove therein, the contact surface of the rotor being urged against the contact surface of the stator such that the rotor groove opposes the stator groove with one end of the rotor groove overlapping the stator groove and the opposite end of the rotor groove overlapping the second port of the stator, the overlapping grooves of the rotor and stator providing a fluidic channel between the first and second ports of the stator, the rotor being movable with respect to the stator to vary a volume of the fluidic channel between the first and second ports of the stator by varying a length of overlap between the overlapping rotor and stator grooves.

2. The variable-volume injection valve of claim 1, wherein the volume of sample introduced to the mobile phase depends on a length of the rotor groove determined from where the one end of the rotor groove begins overlapping the stator groove to where the opposite end of the rotor groove overlaps the second port of the stator.

3. The variable-volume injection valve of claim 1, wherein the first port of the stator is configured to receive sample that enters the rotor groove from the stator groove.

4. The variable-volume injection valve of claim 1, wherein one of the first and second ports of the stator is configured to receive a mobile phase from a pump and the other of the first and second ports is configured to deliver the mobile phase to a column.

5. The variable-volume injection valve of claim 1, wherein the stator further comprises a pump port and a channel port, and the rotor groove is a first rotor groove, the rotor further comprising a second rotor groove that overlaps the pump port and channel port to provide a fluidic channel therebetween when the first rotor groove opposes and overlaps the stator groove, the second rotor groove having a length that is longer than a distance separating the pump port and channel port to maintain the fluidic channel between the pump port and channel port for a plurality of different lengths of overlap between the first rotor groove and the stator groove.

6. The variable-volume injection valve of claim 1, wherein the length of overlap between the overlapping rotor and stator grooves ranges from a partial overlap to a full overlap of the stator groove by the rotor groove.

7. The variable-volume injection valve of claim 1, wherein the stator includes a microfluidic multilayer substrate having an internal fluidic channel.

8. The variable-volume injection valve of claim 7, wherein the multilayer substrate is constructed of titanium.

9. The variable-volume injection valve of claim 1, wherein the stator has a third port and a fourth port, and the contact surface of the rotor has a second groove therein, the second groove of the rotor providing a fluidic path between the third and fourth ports of the stator for each of the at least two different positions of the rotor.

10. A method of introducing a sample to a mobile phase through use of an injection valve comprised of a stator and a rotor, the method comprising:
   urging a contact surface of the rotor against a contact surface of the stator, the contact surface of the rotor having a groove therein and the contact surface of the stator having a groove therein, the stator comprising a first port and a second port, the first port opening into the stator groove;
   providing a fluidic channel between the first and second ports of the stator by positioning the rotor groove over the stator groove such that one end of the rotor groove overlaps the stator groove and the opposite end of the rotor groove overlaps the second port of the stator; and
   varying a volume of the fluidic channel between the first and second ports of the stator by changing an orientation of the rotor with respect to the stator in order to vary a length of the overlap between the overlapping rotor and stator grooves.

11. The method of claim 10, wherein the volume of sample introduced to the mobile phase depends on a length of rotor groove determined from where the one end of the rotor groove begins overlapping the stator groove to where the rotor groove overlaps the second port of the stator.

12. The method of claim 10, further comprising loading sample into the rotor groove through the first port and the stator groove.

13. The method of claim 11, further comprising rotating the rotor relative to the stator such that the sample loaded in the rotor groove is introduced to a mobile phase flowing between two other ports of the stator.

14. The method of claim 10, further comprising:
   completely filling the rotor groove with sample; and
   after the rotor groove is completely filled with the sample, rotating the rotor relative to the stator such that the sample is introduced to a mobile phase flowing between the first and second ports of the stator.

15. The method of claim 10, wherein the length of the overlap between the overlapping rotor and stator grooves ranges from a partial overlap to a full overlap of the stator groove by the rotor groove.

16. The method of claim 10, wherein the stator includes a microfluidic multilayer substrate having an internal fluidic channel.

17. The method of claim 16, wherein the multilayer substrate is constructed of titanium.

18. The method of claim 10, wherein the stator further comprises a third port and a fourth port and the contact surface of the rotor has a second groove therein, and further comprising providing, by the second groove of the rotor, a fluidic path between the third and fourth ports of the stator before, during, and after changing the orientation of the rotor with respect to the stator.

* * * * *